(12) United States Patent
Saeidi et al.

(10) Patent No.: US 9,829,941 B1
(45) Date of Patent: Nov. 28, 2017

(54) MOBILE DEVICE WITH BACKSIDE CAPACITIVE SENSOR FOR THERMAL MANAGEMENT OF AN EXTERIOR HOUSING

(71) Applicant: QUALCOMM Incorporated, San Diego, CA (US)

(72) Inventors: Mehdi Saeidi, San Diego, CA (US); Melika Roshandell, Carlsbad, CA (US); Rajat Mittal, San Francisco, CA (US); Ryan Coutts, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/242,483

(22) Filed: Aug. 19, 2016

(51) Int. Cl.
*H04M 1/00* (2006.01)
*G06F 1/20* (2006.01)
*H04M 1/02* (2006.01)

(52) U.S. Cl.
CPC .......... *G06F 1/206* (2013.01); *H04M 1/0202* (2013.01); *H04M 2250/12* (2013.01)

(58) Field of Classification Search
CPC ......... H04M 1/72519; H04M 1/72522; H04M 1/0124; H04M 2250/12; H04M 1/23; H04M 1/0247; H04M 1/0237; H04M 1/0216; H04M 1/0245
USPC .................... 455/550.1, 90.1, 90.3
See application file for complete search history.

(56) References Cited

U.S. PATENT DOCUMENTS

| | | | |
|---|---|---|---|
| 8,744,418 B2 | 6/2014 | Novet | |
| 8,768,530 B2 | 7/2014 | Liang et al. | |
| 2011/0251733 A1 | 10/2011 | Atkinson et al. | |
| 2014/0215497 A1* | 7/2014 | Guo | H04W 52/0264 719/320 |
| 2014/0236380 A1 | 8/2014 | Alton et al. | |
| 2014/0362518 A1 | 12/2014 | Huang et al. | |
| 2015/0043156 A1* | 2/2015 | Jain | H04M 1/72575 361/679.46 |
| 2015/0234144 A1* | 8/2015 | Cameron | H05K 7/20427 236/1 F |

* cited by examiner

*Primary Examiner* — Nhan Le
(74) *Attorney, Agent, or Firm* — Muncy, Geissler, Olds & Lowe, P.C.

(57) ABSTRACT

A mobile device includes an exterior housing, a display, a capacitive sensor, a temperature sensor, and a controller. The capacitive sensor is coupled to the exterior housing at a backside of the mobile device and the temperature sensor is coupled to one or more components of the mobile device. The controller is coupled to the capacitive sensor and to the temperature sensor. The controller is configured to adjust a temperature threshold of the mobile device in response to detecting the presence of a case installed on the exterior housing. The controller is also configured to adjust one or more operating parameters of the mobile device to control a temperature of the exterior housing to below the temperature threshold based on the output of the capacitive sensor and one or more readings of the temperature sensor.

26 Claims, 11 Drawing Sheets

MOBILE DEVICE WITH BACKSIDE CAPACITIVE SENSOR FOR THERMAL MANAGEMENT OF AN EXTERIOR HOUSING

FIELD OF DISCLOSURE

This disclosure relates generally to thermal management in an electronic device, and in particular, but not exclusively to the thermal management in a mobile device based on the output of a capacitive sensor included at the backside of an exterior housing of the mobile device.

BACKGROUND

With the rapid development in the electronic fields in recent years, the performance of various electronic devices has largely been upgraded to provide higher and higher operating and data processing speeds. With the constantly increased operating speed of the chipsets and the constantly increased number of chips inside the electronic devices, more heat is produced by the electronic devices during their operation.

A user's experience of the electronic device may be governed, in part, based on the user's touch perception of a temperature of the electronic device. For example, if a temperature of the exterior housing of the electronic device (e.g., mobile phone) is too high, then the user may experience discomfort while holding the electronic device in their hand and/or when holding against their face/ear. Furthermore, a user may perceive a warm or hot device as malfunctioning or as not operating correctly.

Accordingly, an electronic device may include a skin temperature limitation that governs how hot the exterior housing of the electronic device is allowed to get during operation. The electronic device may implement one or more thermal mitigation techniques in an attempt to maintain the temperature of the exterior housing to below the skin temperature limit. However, in some conventional electronic devices, the skin temperature limitation may be fixed (i.e., static) based on a contemplated worst case scenario to ensure a satisfactory user comfort level and safety in all situations.

SUMMARY

The following presents a simplified summary relating to one or more aspects and/or embodiments associated with the mechanisms disclosed herein for the thermal management of a mobile device. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary presents certain concepts relating to one or more aspects and/or embodiments relating to the mechanisms disclosed herein to thermally manage a mobile device in a simplified form to precede the detailed description presented below.

According to one aspect, a mobile device includes an exterior housing, a display, a capacitive sensor, a temperature sensor, and a controller. The capacitive sensor is coupled to the exterior housing at a backside of the mobile device and the temperature sensor is coupled to one or more components of the mobile device. The controller is coupled to the capacitive sensor and to the temperature sensor. The controller is configured to adjust a temperature threshold of the mobile device in response to detecting the presence of the case installed on the exterior housing. The controller is also configured to adjust one or more operating parameters of the mobile device to control a temperature of the exterior housing to below the temperature threshold based on the output of the capacitive sensor and one or more readings of the temperature sensor.

According to another aspect, a method includes receiving one or more temperature readings representative of a temperature of an exterior housing at a backside of a mobile device, and receiving an output of a capacitive sensor that is coupled to the exterior housing at the backside of the mobile device. The method also includes detecting a presence of a case installed on the exterior housing based on the output of the capacitive sensor, and adjusting a temperature threshold of the mobile device in response to detecting the presence of the case installed on the exterior housing. One or more operating parameters of the mobile device are then adjusted to control the temperature of the exterior housing to below the temperature threshold based on the output of the capacitive sensor and the one or more readings of the temperature sensor. According to yet another aspect, a mobile device includes an exterior housing and a display. The exterior housing is configured to provide a backside of the mobile device, whereas the display is coupled to the exterior housing to provide a front side of the mobile device. The mobile device further includes: (i) means for sensing a capacitance of the exterior housing at the backside of the mobile device; (ii) means for detecting a temperature of the exterior housing at the backside of the mobile device; (iii) means for detecting a presence of a case installed on the exterior housing based on the capacitance of the exterior housing at the backside of the mobile device; (iv) means for adjusting a temperature threshold of the mobile device in response to detecting the presence of the case installed on the exterior housing; and (v) means for adjusting one or more operating parameters of the mobile device to control a temperature of the exterior housing to below the temperature threshold based on the capacitance and the temperature of the exterior housing at the backside of the mobile device.

According to still another aspect, a non-transitory computer-readable medium includes program code stored thereon for use in a mobile device. The program code includes instructions to direct the mobile device to: (i) receive one or more temperature readings representative of a temperature of an exterior housing at a backside of the mobile device; (ii) receive an output of a capacitive sensor coupled to the exterior housing at the backside of the mobile device; (iii) detect a presence of a case installed on the exterior housing based on the output of the capacitive sensor; (iv) adjust a temperature threshold of the mobile device in response to detecting the presence of the case installed on the exterior housing; and (v) adjust one or more operating parameters of the mobile device to control a temperature of the exterior housing to below the temperature threshold based on the output of the capacitive sensor and one or more readings of the temperature sensor.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Various aspects are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of non-transitory computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter.

Figure 1:
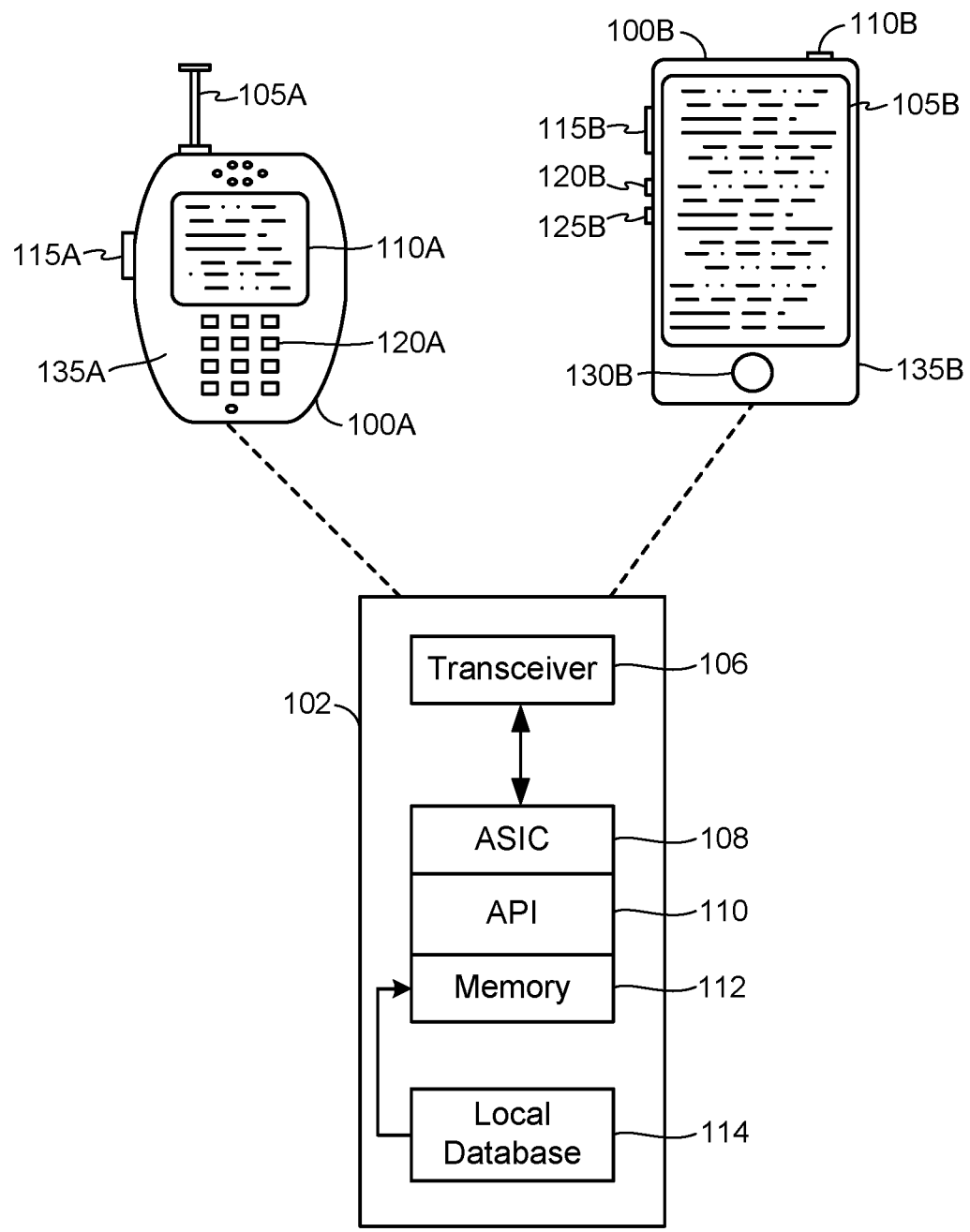
FIG. 1 illustrates examples of mobile devices, according to aspects of the disclosure.

FIG. 1 illustrates examples of mobile devices 100A and 100B in accordance with aspects of the present disclosure. In some examples, mobile devices 100A and 100B may herein be referred to as wireless mobile stations. The example mobile device 100A is illustrated in FIG. 1 as a calling telephone and mobile device 100B is illustrated as a touchscreen device (e.g., a smart phone, a tablet computer, etc.). As shown in FIG. 1, an exterior housing 135A of mobile device 100A is configured with an antenna 105A, a display 110A, at least one button 115A (e.g., a PTT button, a power button, a volume control button, etc.) and a keypad 120A among other components, not shown in FIG. 1 for clarity. An exterior housing 135B of mobile device 100B is configured with a touchscreen display 105B, peripheral buttons 110B, 115B, 120B and 125B (e.g., a power control button, a volume or vibrate control button, an airplane mode toggle button, etc.), at least one front-panel button 130B (e.g., a Home button, etc.), among other components, not shown in FIG. 1 for clarity. For example, while not shown explicitly as part of mobile device 100B, the mobile device 100B may include one or more external antennas and/or one or more integrated antennas that are built into the exterior housing 135B of mobile device 100B, including but not limited to WiFi antennas, cellular antennas, satellite position system (SPS) antennas (e.g., global positioning system (GPS) antennas), and so on.

While internal components of mobile devices such as the mobile devices 100A and 100B can be embodied with different hardware configurations, a basic high-level configuration for internal hardware components is shown as platform 102 in FIG. 1. The platform 102 can receive and execute software applications, data and/or commands transmitted from a radio access network (RAN) that may ultimately come from a core network, the Internet and/or other remote servers and networks (e.g., an application server, web URLs, etc.). The platform 102 can also independently execute locally stored applications without RAN interaction. The platform 102 can include a transceiver 106 operably coupled to an application specific integrated circuit (ASIC) 108, or other processor, microprocessor, logic circuit, or other data processing device. The ASIC 108 or other processor executes the application programming interface (API) 110 layer that interfaces with any resident programs in a memory 112 of the mobile devices 100A and 100B. The memory 112 can be comprised of read-only or random-access memory (RAM and ROM), EEPROM, flash cards, or any memory common to computer platforms. The platform 102 also can include a local database 114 that can store applications not actively used in memory 112, as well as other data. The local database 114 is typically a flash memory cell, but can be any secondary storage device as known in the art, such as magnetic media, EEPROM, optical media, tape, soft or hard disk, or the like.

In one aspect, wireless communications by mobile devices 100A and 100B may be based on different technologies, such as CDMA, W-CDMA, time division multiple access (TDMA), frequency division multiple access (FDMA), Orthogonal Frequency Division Multiplexing (OFDM), GSM, 2G, 3G, 4G, LTE, or other protocols that may be used in a wireless communications network or a data communications network. Voice transmission and/or data can be transmitted to the mobile devices from a RAN using a variety of networks and configurations. Accordingly, the illustrations provided herein are not intended to limit the embodiments of the invention and are merely to aid in the description of aspects of embodiments of the invention.

Accordingly, aspects of the present disclosure can include a mobile device (e.g., mobile device 100A, 100B, etc.) configured, and including the ability to perform the functions as described herein. As will be appreciated by those skilled in the art, the various logic elements can be embodied in discrete elements, software modules executed on a processor or any combination of software and hardware to achieve the functionality disclosed herein. For example, ASIC 108, memory 112, API 110 and local database 114 may all be used cooperatively to load, store and execute the various functions disclosed herein and thus the logic to perform these functions may be distributed over various elements. Alternatively, the functionality could be incorporated into one discrete component. Therefore, the features of the mobile devices 100A and 100B in FIG. 1 are to be considered merely illustrative and the invention is not limited to the illustrated features or arrangement.

As discussed above, a user's experience of the mobile device may be governed, in part, based on the user's touch perception of a temperature of the mobile device. For example, a sensed hotness of the mobile devices 100A or 100B by a user as the user touches the exterior housing 135A or 135B, respectively, may impact the user's experience with the mobile devices 100A or 100B. That is, a perceived hotness may result in discomfort by the user as the user touches the exterior housing 135A or 135B. Accordingly, in some examples, the mobile devices 100A and 100B are configured to maintain a temperature of the exterior housing 135A and 135B, respectively, to less than a temperature threshold, (also referred to as a skin temperature limit). The skin temperature limit may be a temperature value at which a typical user of the mobile device would perceive that the exterior housing is too hot. In one implementation, a baseline skin temperature limit is determined empirically prior to deployment of the mobile device. In some aspects, the baseline skin temperature limit of the mobile devices 100A and 100B may be in the range of about 40° C. to about 45° C.

In some conventional mobile devices, the skin temperature limitation may be fixed (i.e., static) based on a contemplated worst case scenario to ensure a satisfactory user comfort level and safety in all situations.

Conventional mobile devices which address thermal management of the mobile device are typically implemented with thermal algorithms that are tuned to mitigate the thermal temperature of the exterior housing at a fixed (i.e., static) skin temperature limit. Thus, thermal mitigation in these conventional mobile devices is not typically optimized to maximize performance Instead, the skin temperature limit is set conservatively to simply cover worst case scenarios. Furthermore, many, if not most, users of a mobile device install some sort of case on the exterior housing. The case may be plastic, silicone, leather, wood, rubber, or other material, and may be intended to provide protection of the mobile device against physical impacts or may just be decorative.

In some situations, a case installed on the exterior housing of the mobile device may provide additional insulation between the user and the exterior housing such that the temperature of the exterior housing is actually higher than the temperature perceived by the user touching the case. Accordingly, the mobile devices 100A and 100B are configured to allow the temperature of the exterior housing 135A or 135B to be higher when a case is installed than when a case is not installed. For example, as will be discussed in more detail below, mobile devices 100A and 100B may include a capacitive sensor coupled to the exterior housing 135A or 135B at a backside of the mobile devices 100A and 100B in order to detect the presence of a case installed on the exterior housing 135A or 135B. The mobile devices 100A and 100B may then adjust a temperature threshold (e.g., skin temperature limit) of the mobile devices 100A and 100B based on the output of the capacitive sensor.

Figure 2A:
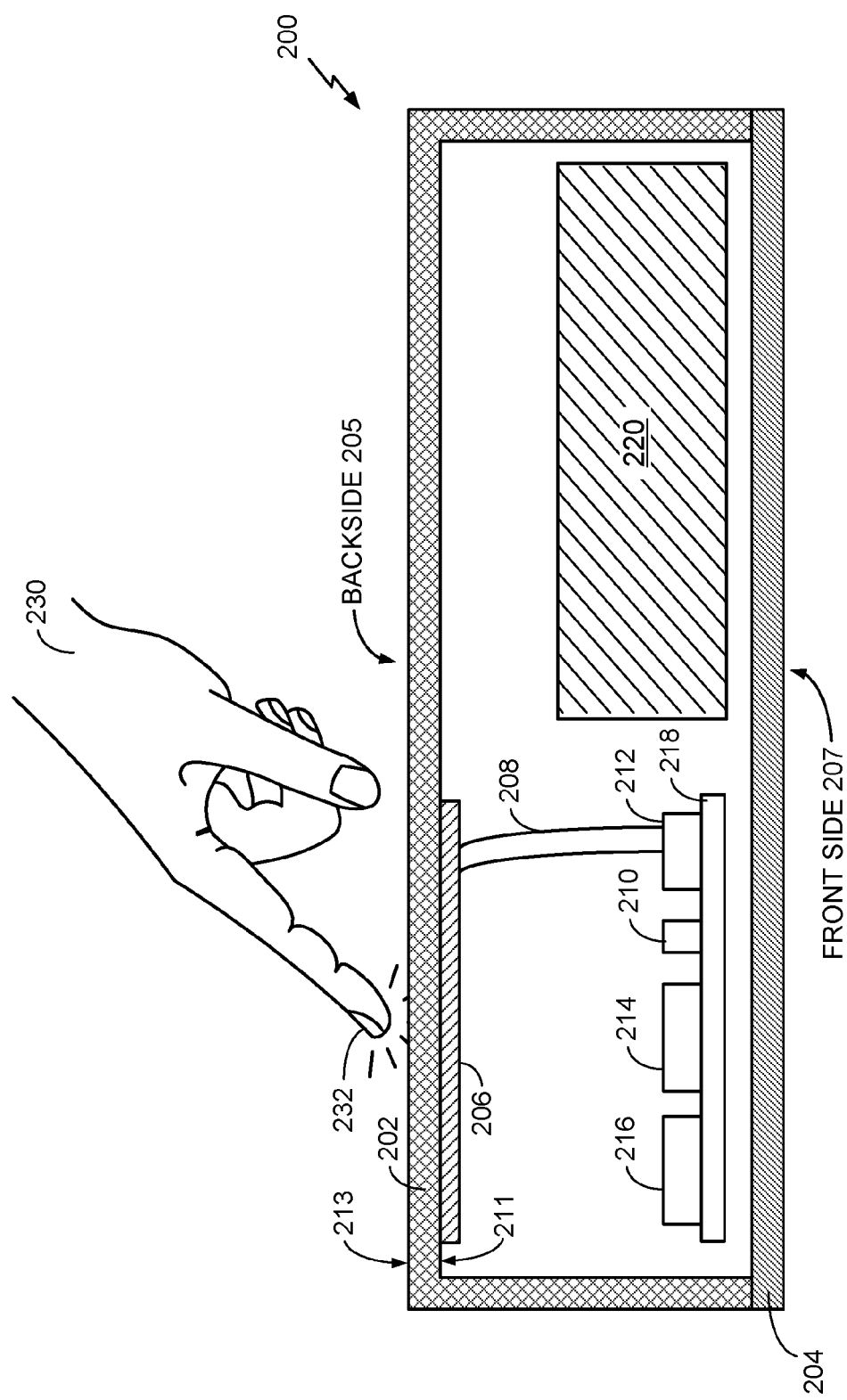
FIG. 2A illustrates an example mobile device without a case installed on an exterior housing of the mobile device, according to aspects of the disclosure.
Figure 2B:
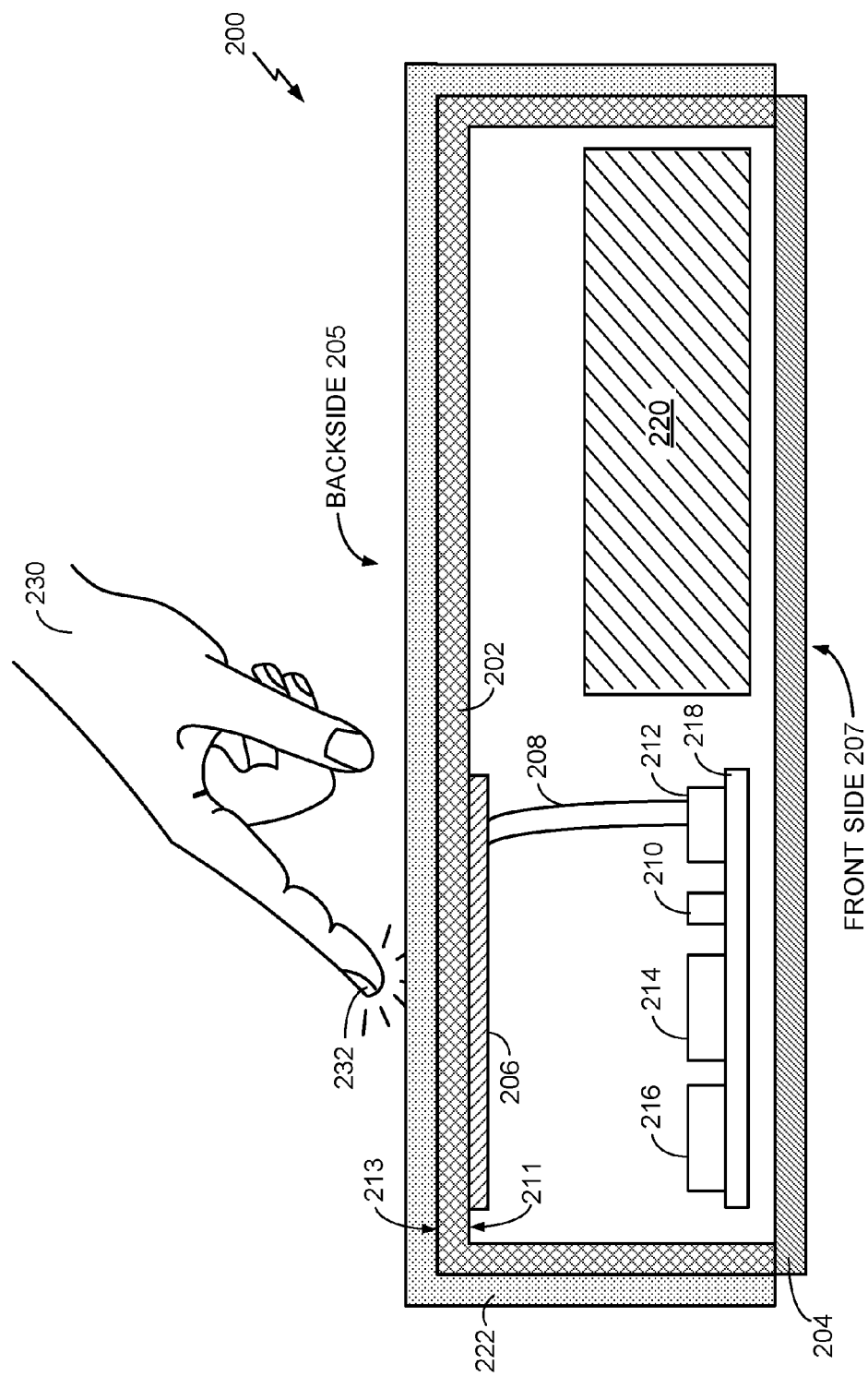
FIG. 2B illustrates the example mobile device of FIG. 2A with a case installed on the exterior housing of the mobile device, according to aspects of the disclosure.

FIG. 2A illustrates an example mobile device 200 without a case installed on an exterior housing 202 of the mobile device 200, according to aspects of the disclosure. FIG. 2B illustrates mobile device 200 with a case 222 installed on the exterior housing 202 of the mobile device 200, according to aspects of the disclosure. Case 222 may be plastic, silicone, leather, wood, rubber, or other material, and may be intended to provide protection of the mobile device 200 against physical impacts or may just be decorative. In some examples, case 222 is installed by a user (e.g., user 230) of the mobile device 200. Furthermore, case 222 may be removable by the user 230.

Mobile device 200 is one possible implementation of mobile devices 100A and/or 100B of FIG. 1. Mobile device 200 is illustrated as including an exterior housing 202, a display 204, a temperature sensor 210, a controller 212, electronic components 214, 216, and 220, and a printed circuit board (PCB) 218. Also included in the mobile device 200 is a capacitive sensor including a metal plate 206 and one or more wires 208.

In one example, the PCB 218 is configured to mechanically support and electrically connect one or more active and/or passive electronic components and may include one or more substrates. PCB 218 may be a single-sided, a double-sided, or a multi-layer PCB. Components 214 and 216 may each be an integrated circuit that is disposed on the PCB 218 and may be fixedly attached to the PCB 218 by way of one or more conductive pads, solder balls, leads, and/or wires. In one example, the component 214 and/or component 216 may be a system-on-chip (SoC), such as a mobile station modem (MSM) integrated circuit. The MSM integrated circuit may include a processor, multiple central processing unit (CPU) cores, a graphics processing unit (GPU), a wireless modem, and other hardware and/or hardware/software combinations that support one or more systems of the mobile device 200, such as a global positioning system (GPS) and/or a camera, etc.

Exterior housing 202 is configured to provide a backside 205 of the mobile device 200 and is shown as including an interior surface 211 and an exterior surface 213. The exterior housing 202 may correspond to the exterior housing 135A and 135B of mobile devices 100A and 100B, respectively, of FIG. 1. In one example, the exterior housing 202 includes metal. In another example, exterior housing 202 may include an insulating material, such as plastic. Interior surface 211 may be a surface of the exterior housing 202 facing the electronic components 214 and 216, whereas, exterior surface 213 may be the surface upon which a user 230 of the mobile device 200 touches the mobile device 200. In certain aspects, exterior surface 213 is the surface upon which the temperature of the mobile device 200 is sensed by the user 230 when the user 230 touches the backside 205 of the mobile device 200 when case 222 is not installed. As shown in FIG. 2B, when installed, case 222 is disposed on the exterior surface 213 of the exterior housing 202 between the exterior surface 213 and the user 230. In one example, electronic component 220 is a battery, but may include any other passive or active electronic components of the mobile device 200.

Further shown in FIG. 2A, is a display 204. In one example, display 204 is a liquid crystal display (LCD). Display 204 may be coupled to the exterior housing 202 to provide a front side 207 of the mobile device 200 that is opposite the backside 205.

Mobile device 200 further includes a temperature sensor 210. Temperature sensor 210 may be coupled to one or more components of the mobile device 200. For example, in the illustrated example of FIG. 2A, temperature sensor 210 is coupled to PCB 218. Temperature sensor 210, in one example, may be a thermistor. Temperature sensor 210 is configured to generate temperature readings that are representative of a temperature of exterior housing 202 at the backside 205 of the mobile device 200. That is, while temperature sensor 210 is shown as being disposed on PCB 218, the temperature readings generated by temperature sensor 210 may be calibrated such that they are representative of the temperature at the exterior surface 213 of the exterior housing 202 at the backside 205 of the mobile device 200. In some examples, temperature sensor 210 may be located elsewhere within mobile device 200, such as integrated within one or more of the electronic components 214/216 and/or disposed directly on or within the exterior housing 202.

As mentioned above, mobile device 200 further includes a capacitive sensor. The capacitive sensor may sense a capacitance of the exterior housing 202 at the backside 205 of the mobile device 200. For example, FIG. 2A illustrates a metal plate 206 disposed on the interior surface 211 of the exterior housing 202. Metal plate 206 provides a first storage conductor of a capacitor, whereas a user 230 touching the exterior surface 213 of the exterior housing 202 provides a second storage conductor of the capacitor of the capacitive sensor. In one aspect, metal plate 206 is connected to a common reference (e.g., ground) to reduce parasitic device capacitance. In the illustrated example, exterior housing 202 includes an insulating material (e.g., plastic, glass, etc.) that provides the dielectric portion of the capacitor of the capacitive sensor. Thus, a capacitor of the capacitive sensor of FIG. 2A is provided by a first storage conductor (i.e., metal plate 206) separated from the second storage conductor (e.g., fingertip 232 of user 230) by at least a dielectric material (e.g., insulating material of exterior housing 202). Thus, as the user 230 touches the exterior surface 213 of the exterior housing 202 (e.g., by way of fingertip 232) the capacitance sensed by the capacitive sensor may change. Furthermore, when case 222 is installed over the exterior surface 213 of the exterior housing 202, a user touch of the case 222 may change the capacitance sensed by the capacitive sensor. However, the capacitance sensed by the capacitive sensor when case 222 is installed (e.g., FIG. 2B) may be different than the capacitance sensed by the capacitive sensor when no case is installed (e.g., FIG. 2A). Accordingly, as will be discussed in more detail below, mobile device 200 may detect whether or not case 222 is installed based on an output of the capacitive sensor (e.g., the capacitance of the capacitor provided by metal plate 206, the insulating material of exterior housing 202, and the user 230).

By way of example, metal plate 206 is electrically connected to a controller 212 by way of one or more wires 208. Controller 212 is configured to obtain one or more readings of the capacitive sensor by way of wires 208. During operation, controller 212 may detect the presence of the case 222 installed on the exterior housing 202 based on the output of the capacitive sensor. Controller 212 may also detect whether user 230 is touching the backside 205 of the mobile device 200 based on the output of the capacitive sensor. That is, controller 212 may detect when a user 230 is touching the exterior surface 213, directly, and when the user 230 is touching a surface of the case 222 installed over the exterior surface 213.

In some examples, controller 212 may include one or more active and/or passive electronic components configured to perform the operations, as discussed herein. In one example, controller 212 is included within an integrated circuit, such as electronic component 214. In another example, the controller 212 is located elsewhere within mobile device 200, such as disposed on or within PCB 218. Controller 212 may further be configured to adjust one or more operating parameters of the mobile device 200 to control a temperature of the exterior housing 202 based on the output of the capacitive sensor and one or more readings of the temperature sensor 210. For example, electronic component 214 may include a processor coupled to controller 212 by way of one or more metal lines included in PCB 218, wherein controller 212 is configured to control an operating frequency of the processor to manage the temperature of the exterior housing 202. That is, reducing the frequency of the processor of electronic component 214 may reduce the temperature of the exterior housing 202, whereas increasing the frequency may increase the temperature of the exterior housing 202.

Figure 3:
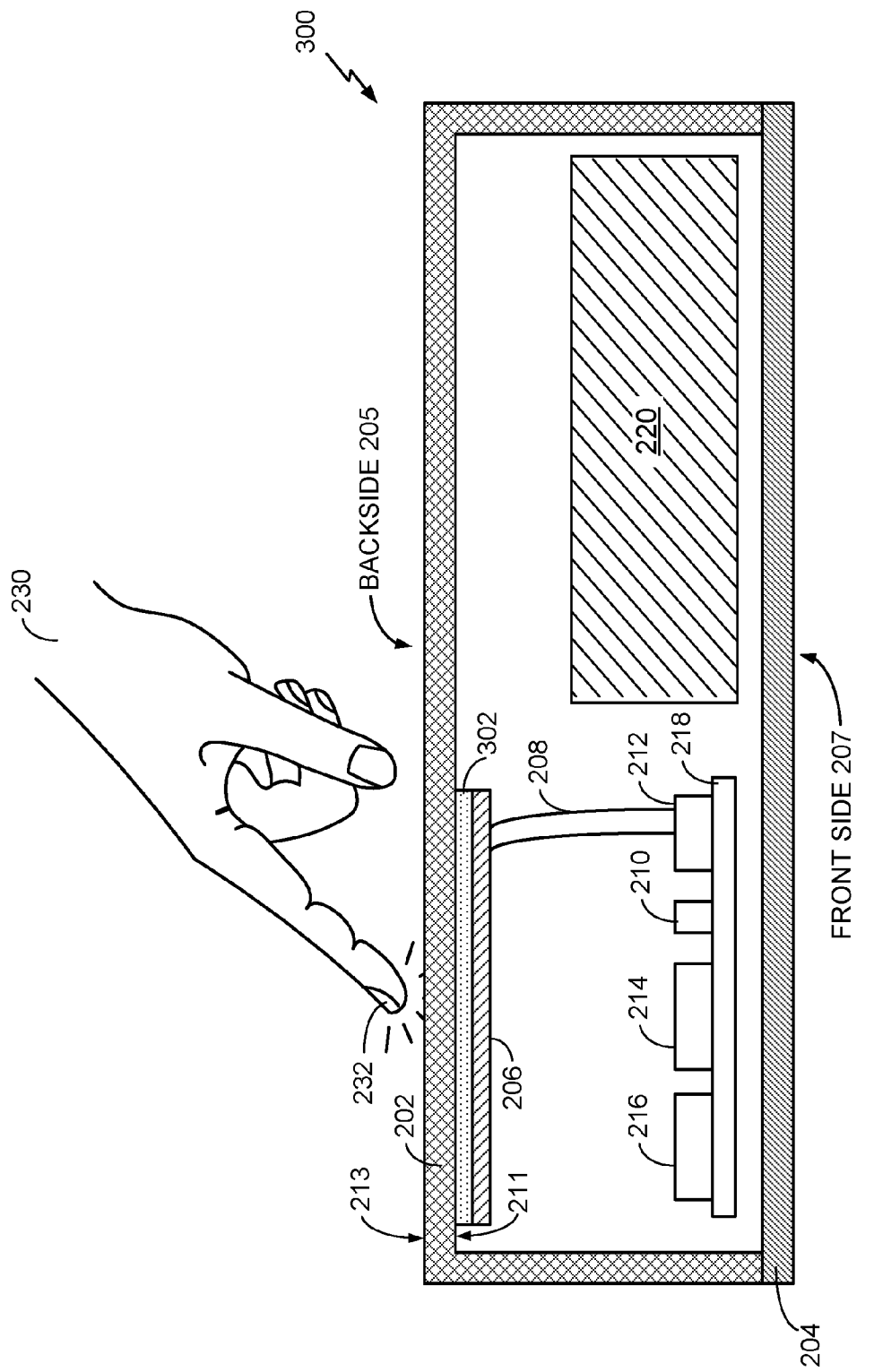
FIG. 3 illustrates another example mobile device having an insulating material disposed between a metal plate of the capacitive sensor and the exterior housing, according to aspects of the disclosure.

FIG. 3 illustrates another example mobile device 300, according to aspects of the disclosure. Mobile device 300 is similar to mobile device 200 of FIGS. 2A and 2B, where like numerals are used to indicate like elements. However, the exterior housing 202 of mobile device 300 includes metal (e.g., aluminum). Thus, the capacitive sensor of mobile device 300 includes an insulating material 302 disposed between the metal plate 206 and the exterior housing 202. As shown in FIG. 3, the metal plate 206 is disposed on insulating material 302, and the insulating material 302 is disposed on the interior surface 211 of the exterior housing 202 between the interior surface 211 and the metal plate 206. Thus, metal plate 206 provides a first storage conductor of a capacitor, whereas a user 230 touching the exterior surface 213 of the exterior housing 202 provides a second storage conductor of the capacitor of the capacitive sensor. In the illustrated example of FIG. 3, the insulating material 302 provides the dielectric portion of the capacitor of the capacitive sensor. Thus, a capacitor of the capacitive sensor of FIG. 3 is provided by a first storage conductor (i.e., metal plate 206) separated from the second storage conductor (e.g., fingertip 232 of user 230) by at least a dielectric material (e.g., insulating material 302).

Figure 4:
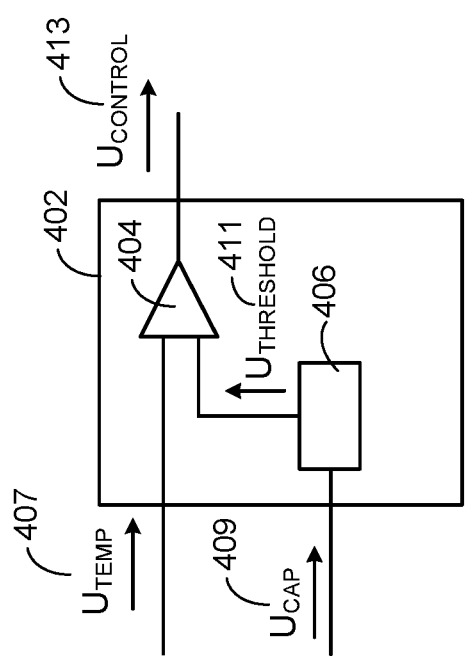
FIG. 4 illustrates an example controller for use in a mobile device, according to aspects of the disclosure.

FIG. 4 illustrates an example controller 402 for use in a mobile device, according to aspects of the disclosure. Controller 402 is one possible implementation of controller 212 of FIGS. 2A-3. As mentioned above, controller 402 may include one or more active and/or passive electronic components configured to perform the operations described herein. In other examples, controller 402 may be implemented by way of a combination of software and hardware. Accordingly, the elements illustrated in the example of FIG. 4 are merely examples presented to describe the operations of controller 402 and are not intended to limit possible implementation of controller 402 to discrete circuit elements.

The illustrated example of controller 402 includes a comparator 404 and a threshold generator 406. The threshold generator 406 is configured to receive a capacitance signal $U_{CAP}$ 409. In one example, the capacitance signal $U_{CAP}$ 409 is the output of the capacitive sensor of the mobile device 200. In one possible implementation, the capacitance signal $U_{CAP}$ 409 is a voltage across the capacitor of the capacitance signal. In some examples, threshold generator 406 is calibrated to correlate the capacitance signal $U_{CAP}$ 409 with a user touch. Even still, threshold generator 406 may be calibrated to correlate the capacitance signal $U_{CAP}$ 409 with user touches that occur when case 222 is not installed as well as user touches that occur when case 222 is installed on mobile device 200. The threshold generator 406 then generates a threshold signal $U_{THRESHOLD}$ 411 based on the capacitance signal $U_{CAP}$ 409. The threshold signal $U_{THRESHOLD}$ 411 is representative of a temperature threshold, such as a skin temperature limit, that limits the temperature of the exterior housing 202. As will be discussed below, threshold generator 406 may adjust the temperature threshold to a first value in response to detecting the presence of case 222 installed on the exterior housing 202 of the mobile device 200 (e.g., as in FIG. 2B). The threshold generator 406 may also adjust the temperature threshold to a second value in response to detecting the absence of case 222 installed on the exterior housing 202 (e.g., as in FIG. 2A). The first value of the temperature threshold may be greater than the second value to allow the temperature of the exterior housing 202 to be greater when case 222 is installed than when the case 222 is not installed on the exterior housing 202.

Still referring to FIG. 4, controller 402 includes a comparator 404 that is configured to generate a control signal $U_{CONTROL}$ 413 based on a comparison of the temperature signal $U_{TEMP}$ 407 with the threshold signal $U_{THRESHOLD}$ 411. The temperature signal $U_{TEMP}$ 407 may include one or more readings received, or otherwise obtained, from the temperature sensor 210. In one example, the control signal $U_{CONTROL}$ 413 is provided to one or more components (e.g., components 214/216) to adjust one or more operating parameters of the mobile device 200 to control the temperature of the exterior housing 202 to below the temperature threshold indicated in the threshold signal $U_{THRESHOLD}$ 411. For example, comparator 404 may determine that the temperature signal $U_{TEMP}$ 407 indicates that the temperature of the exterior housing 202 has exceeded the current temperature threshold indicated in the threshold signal $U_{THRESHOLD}$ 411, and in response, generate the control signal $U_{CONTROL}$ 413 to reduce an operating frequency of one or more processors included in electronic component 214 and/or 216. In one example, the control signal $U_{CONTROL}$ 413 is provided to the electronic components 214 and/or 216 by way of one or more metal lines included in PCB 218.

Figure 5:
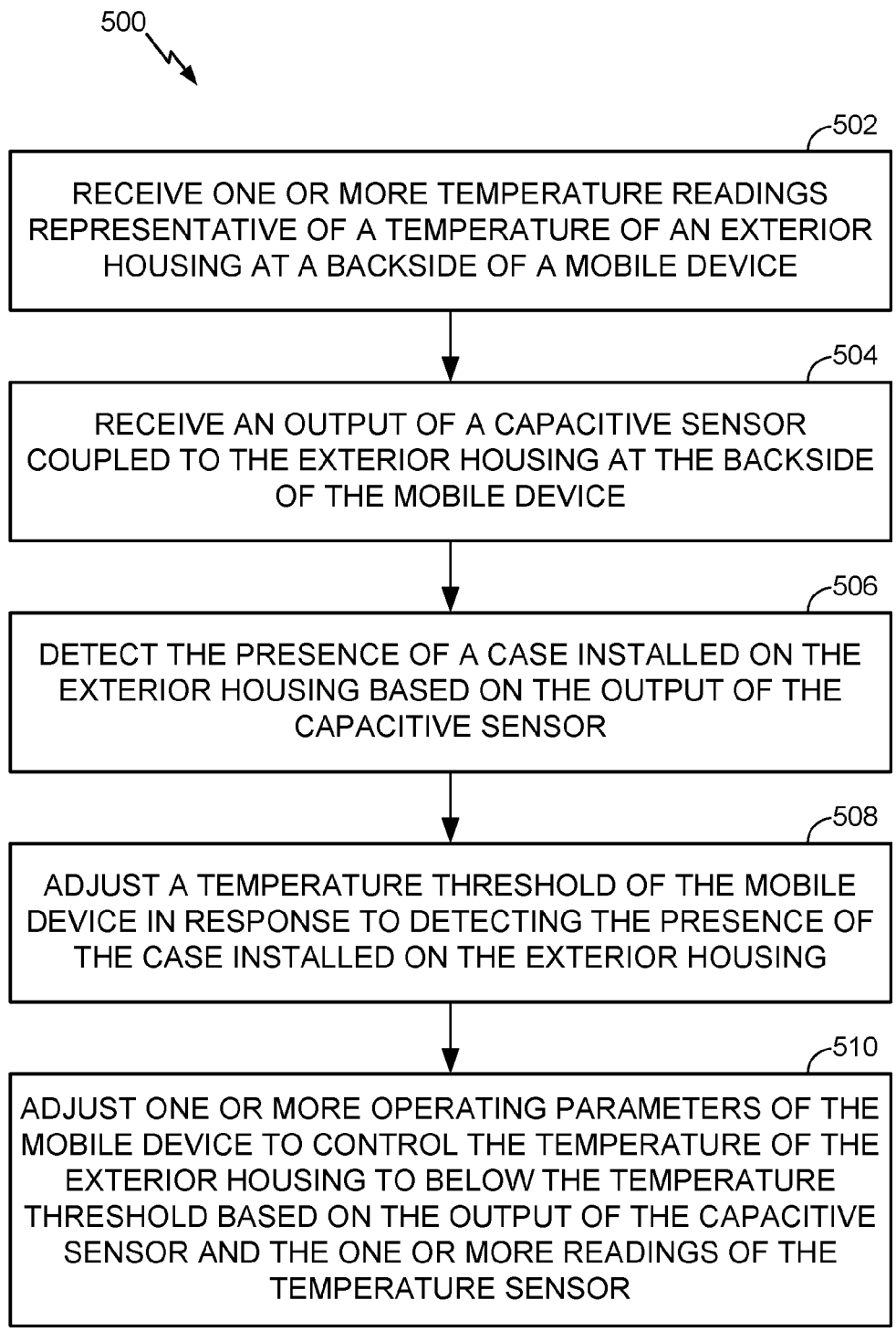
FIG. 5 illustrates an example process of thermal management in a mobile device, according to aspects of the disclosure.

FIG. 5 illustrates an example process 500 of thermal management in a mobile device, according to aspects of the disclosure. Process 500 is one possible process performed by mobile devices 100A, 100B, 200, and/or 300.

In a process block 502, a controller, such as controller 212, receives one or more temperature readings representative of a temperature of the exterior housing 202 at the backside 205 of mobile device 200. In one example, the one or more temperature readings are provided by temperature sensor 210 by way of temperature signal $U_{TEMP}$ 407. In process block 504, the controller 212 receives an output of a capacitive sensor (e.g., metal plate 206 separated from the fingertip 232 of user 230 by at least the insulating material of exterior housing 202). In one example, the output of the capacitive sensor is provided by way of capacitance signal $U_{CAP}$ 409.

Next, in process block 506, the controller 212 detects the presence of case 222 installed on the exterior housing 202 based on the output of the capacitive sensor. For example, as discussed above, the threshold generator 406 of FIG. 4 may be calibrated to correlate the capacitance signal $U_{CAP}$ 409 with user touches that occur when case 222 is not installed as well as user touches that occur when case 222 is installed on mobile device 200.

In process bock 508, the controller 212 adjusts a temperature threshold of the mobile device 200 in response to detecting the presence of the case 222 installed on the exterior housing 202. As mentioned above, the temperature threshold may be a skin temperature limit and is representative of a desired temperature of the exterior housing 202 at exterior surface 213. Thus, in process block 510, the controller 212 adjusts one or more operating parameters of the mobile device 200 to control the temperature of the exterior housing 202 to below the temperature threshold. As will be discussed below, the adjustment of the one or more operating parameters may be based on the output of the capacitive sensor and on the one or more readings of the temperature sensor 210.

Figure 6:
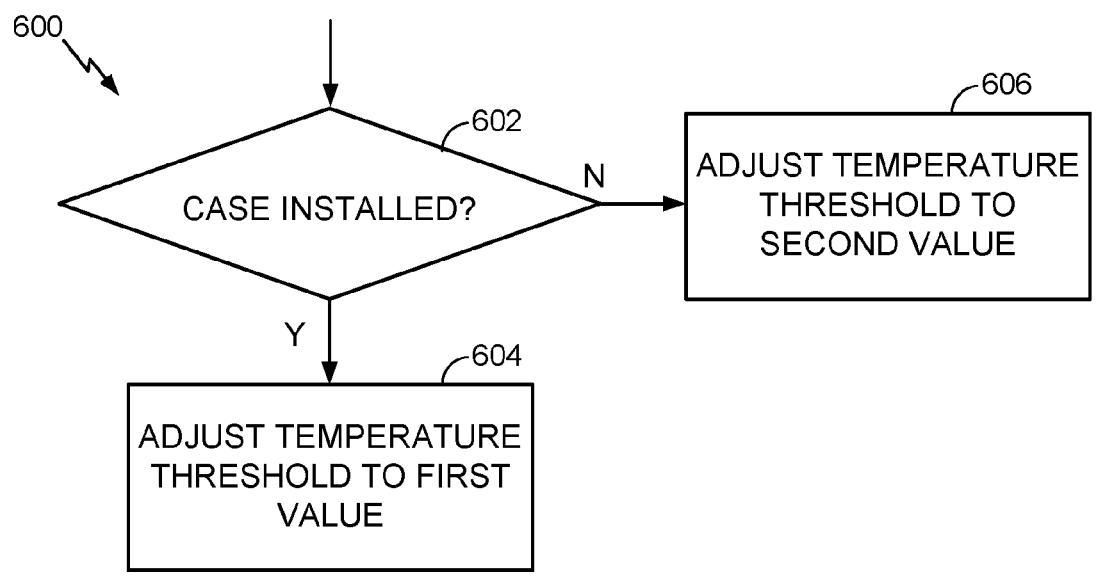
FIG. 6 illustrates an example process of adjusting a temperature threshold of a mobile device, according to aspects of the disclosure.

FIG. 6 illustrates an example process 600 of adjusting a temperature threshold of a mobile device, according to aspects of the disclosure. Process 600 is one possible implementation of process block 508 of FIG. 5. In decision block 602, the controller 212 detects the presence of case 222 installed on the exterior housing 202 of the mobile device 200. As mentioned above, the threshold generator 406 of FIG. 4 may be configured to detect whether case 222 is installed based on an output of the capacitive sensor (e.g., the capacitance signal $U_{CAP}$ 409). In response to detecting the presence of case 222, the threshold generator 406 may adjust the temperature threshold to a first value (i.e., process block 604). Conversely, in response to detecting the absence of case 222, the threshold generator 406 may adjust the temperature threshold to a second value (i.e., process block 606). The first value of the temperature threshold may be greater than the second value to allow the temperature of the exterior housing 202 to be greater when case 222 is installed on the exterior housing 202 than when the case 222 is not installed on the exterior housing 202.

Figure 7:
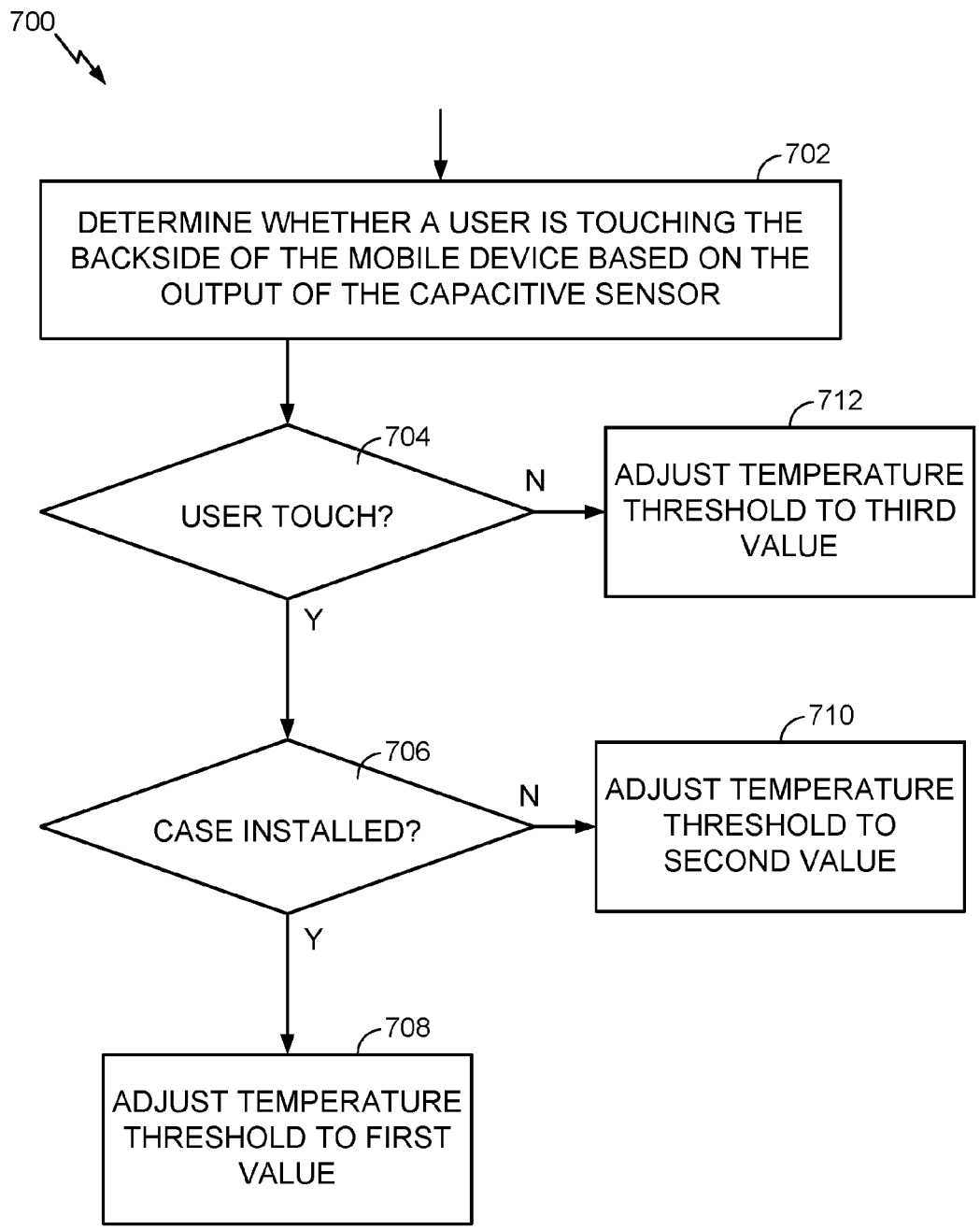
FIG. 7 illustrates another example process of adjusting a temperature threshold of a mobile device, according to aspects of the disclosure.

FIG. 7 illustrates another example process 700 of adjusting the temperature threshold of a mobile device, according to aspects of the disclosure. Process 700 is one possible implementation of process block 508 of FIG. 5. As mentioned above, the controller 212 may be configured to not only detect whether user 230 is touching the backside 205 of the mobile device 200, but also to detect whether the case 222 is installed. Accordingly, process 700 includes adjusting the temperature threshold of the mobile device 200 depending on the various scenarios of user touch with or without case 222 installed. For example, in process block 702, controller 212 determines whether a user is touching the backside 205 of the mobile device 200 based on the output of the capacitive sensor. That is, as the user 230 touches the backside 205 (e.g., by way of fingertip 232) the capacitance sensed by the capacitive sensor may change. In decision block 704, if a user touch is detected, process 700 proceeds to decision block 706, where controller 212 determines whether case 222 is installed on the exterior housing 202. If so, process block 708 includes controller 212 adjusting the temperature threshold to a first value. Accordingly, adjusting the temperature threshold to the first value is in response to both: (1) the output of the capacitive sensor indicating that user 230 is touching the backside 205 of the mobile device 200; and (2) the output of the capacitive sensor indicating the presence of the case 222 installed on the exterior housing 202.

If, in decision block 706, the absence of case 222 is detected (i.e., case 222 is not installed as in FIG. 2A), the process 700 proceeds to process block 710 where controller 212 adjusts the temperature threshold to a second value. Thus, adjusting the temperature threshold to the second value is in response to both: (1) the output of the capacitive sensor indicating that user 230 is touching the backside 205 of the mobile device 200; and (2) the output of the capacitive sensor indicating the absence of the case 222 installed on the exterior housing 202.

Returning back to decision block 704, if no user touch is detected, then process 700 may proceed to process block 712, where controller 212 adjusts the temperature threshold to a third value. That is, the controller 212 may adjust the temperature threshold in response to the output of the capacitive sensor indicating that user 230 is not touching the backside 205 of the mobile device 200, regardless of whether case 222 is installed or not.

In one example, the first value of the temperature threshold is greater than the second value and the third value is greater than the first value (i.e., second value <first value <third value). Thus, the controller 212 may maintain the temperature of the exterior housing 202 to the lowest temperature (i.e., the first value) when user 230 is touching the backside 205 of the mobile device 200 with no case installed. Similarly, controller 212 may maintain the temperature of the exterior housing 202 to a higher temperature (i.e., the second value) when the user 230 is touching the backside 205 of the mobile device 200 when case 222 is installed, since the case 222 may reduce the temperature sensed by the user 230. Lastly, the controller 212 may allow the temperature of the exterior housing 202 to reach its highest temperature (i.e., the third value) when the user 230 is not touching the backside 205 of the mobile device 200 since user comfort/safety is not an issue when user 230 is not touching the backside 205.

Figure 8:
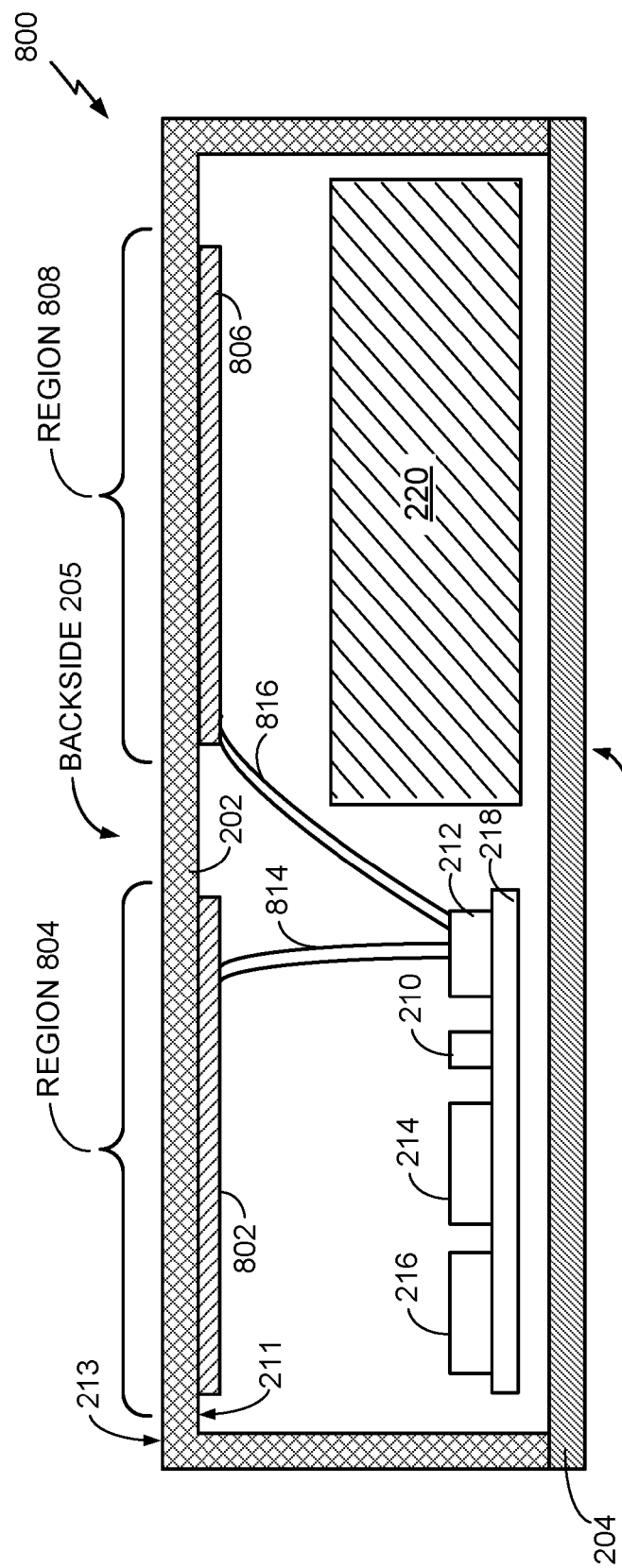
FIG. 8 illustrates an example mobile device having first and second capacitive sensors located in first and second regions, respectively, of a backside of the mobile device, according to aspects of the disclosure.

FIG. 8 illustrates an example mobile device 800, according to aspects of the disclosure. Mobile device 800 is similar to mobile device 200 of FIGS. 2A and 2B, where like numerals are used to indicate like elements. However, the mobile device 800 includes multiple capacitive sensors located in multiple regions of the backside 205 of the mobile device 800. While mobile device 800 may include more than two capacitive sensors, FIG. 8 illustrates only a first capacitive sensor 802 and a second capacitive sensor 806 for ease of explanation.

As shown in FIG. 8, the first capacitive sensor 802 is coupled to the exterior housing 202 at a first region 804 of the backside 205 of the mobile device 800, whereas, the second capacitive sensor 806 is coupled to the exterior housing 202 at a second region 808 of the backside 205 of the mobile device 800. The first capacitive sensor 802 is configured to change capacitance in response to user touches in the first region 804 and the second capacitive sensor 806 is configured to change capacitance in response to user touches in the second region 808. As shown in FIG. 8, the first region 804 may be a region of the exterior housing 202 that is proximate to the electronic components 214/216 and thus, may be more adversely affected by heat generated from these electronic components. That is, the heat generated by electronic components 214/216 may increase the temperature of the exterior housing 202 at the first region 804 greater than the temperature of the exterior housing 202 at the second region 808.

Figure 9:
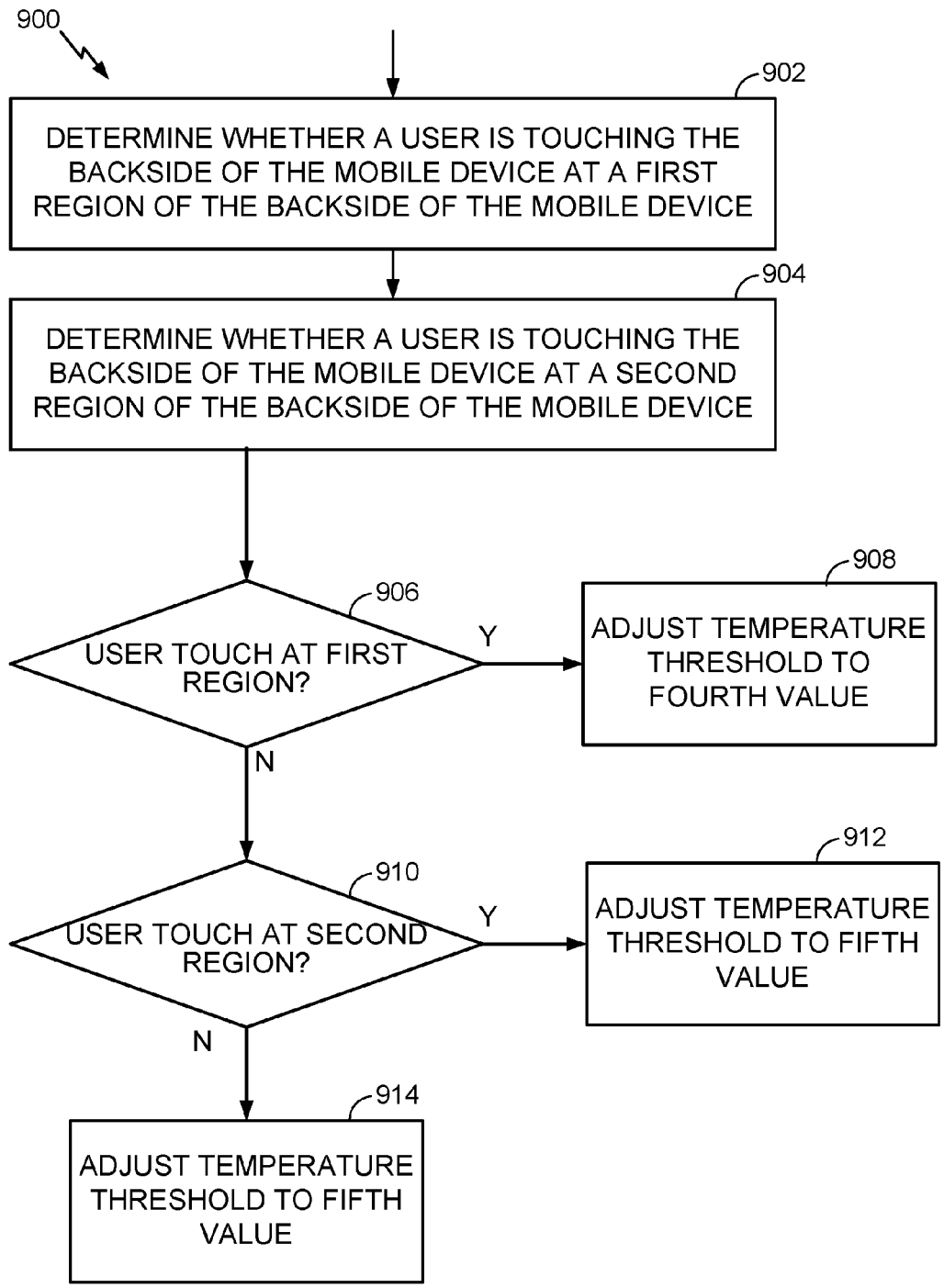
FIG. 9 illustrates an example process of adjusting a temperature threshold of a mobile device having multiple capacitive sensors, according to aspects of the disclosure.

The operation of mobile device 200 will now be described with reference to process 900 of FIG. 9. In a process block 902, the controller 212 determines whether the user 230 is touching the backside 205 of the mobile device 800 at the first region 804. In a process block 904, the controller 212 determines whether the user 230 is touching the backside 205 of the mobile device 800 at the second region 808. In decision block 906, if it is determined that the user 230 is touching the first region 804, process 900 proceeds to process block 908, where the controller 212 adjusts the temperature threshold of the mobile device 800 to a fourth value. In decision block 910, if it is determined that the user 230 is touching the second region 808, then process 900 proceeds to process block 912 where the controller 212 adjusts the temperature threshold to a fifth value. In one example, the fourth value of the temperature threshold is less than the fifth value to allow the temperature of the exterior housing 202 at the first region 804 to be greater when the user 230 is touching the second region 808 and not the first region 804.

Lastly, if the user 230 is not touching the backside 205 of the mobile device 800 at either the first region 804 or the second region 808, the process block 914 includes the controller 212 adjusting the temperature threshold of the mobile device 800 to the fifth value.

Figure 10:
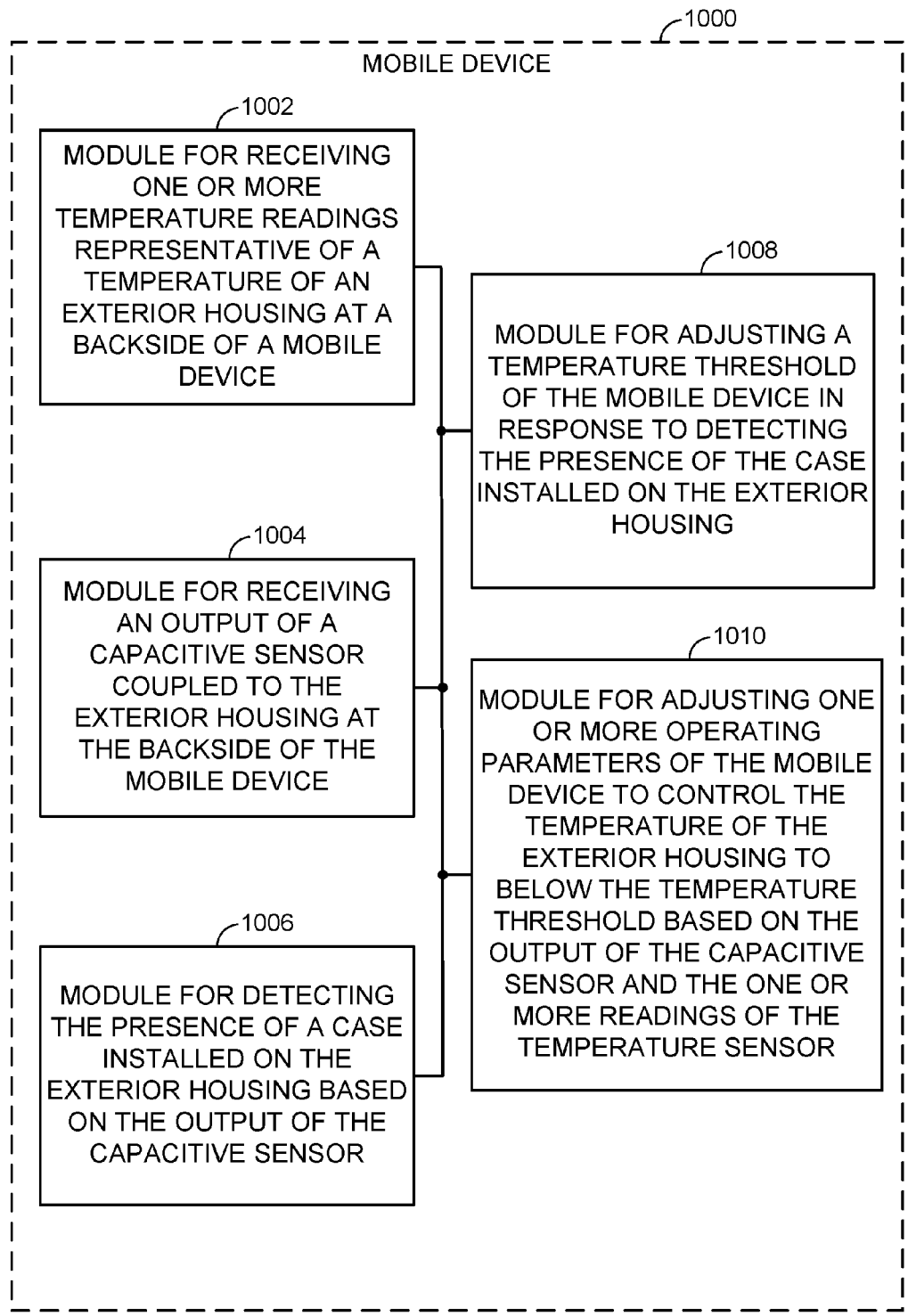
FIG. 10 illustrates sample aspects of components that may be employed in an mobile device configured to support the thermal management of the mobile device, according to aspects of the disclosure.

FIG. 10 illustrates sample aspects of components that may be employed in a mobile device configured to support the thermal management of the mobile device, according to aspects of the disclosure. Mobile device 1000 is one possible implementation of mobile devices 100A or 100B of FIG. 1, mobile device 200 of FIGS. 2A-2B, mobile device 300 of FIG. 3, and/or mobile device 800 of FIG. 8.

A module 1002 for receiving one or more temperature readings representative of a temperature of an exterior housing at a backside of a mobile device may correspond at least in some aspects to, for example, an ASIC 108 of FIG. 1, a memory 112 of FIG. 1, a controller 212 of FIG. 2A, a temperature sensor 210 of FIG. 2A, and/or a controller 402 of FIG. 4. A module 1004 for receiving an output of a capacitive sensor may correspond at least in some aspects to, for example, an ASIC 108 of FIG. 1, a memory 112 of FIG. 1, a controller 212 of FIG. 2A, and/or a controller 402 of FIG. 4. A module 1006 for detecting the presence of a case installed on the exterior housing based on the output of the capacitive sensor may correspond at least in some aspects to, for example, an ASIC 108 of FIG. 1, a memory 112 of FIG. 1, a controller 212 of FIG. 2A, a controller 402 of FIG. 4, and/or threshold generator 406 of FIG. 4. A module 1008 for adjusting a temperature threshold of the mobile device in response to detecting the presence of the case installed on the exterior housing may correspond at least in some aspects to, for example, an ASIC 108 of FIG. 1, a memory 112 of FIG. 1, a controller 212 of FIG. 2A, and/or a controller 402 of FIG. 4, and/or threshold generator 406 of FIG. 4. A module 1010 for adjusting one or more operating parameters of the mobile device to control the temperature of the exterior housing may correspond at least in some aspects to, for example, an ASIC 108 of FIG. 1, a memory 112 of FIG. 1, a controller 212 of FIG. 2A, a temperature sensor 210 of FIG. 2A, and/or a controller 402 of FIG. 4, and/or comparator 404 of FIG. 4.

The functionality of the modules 1002-1010 may be implemented in various ways consistent with the teachings herein. In some designs, the functionality of modules 1002-1010 may be implemented as one or more electrical components. In some designs, the functionality of modules 1002-1010 may be implemented as a processing system including one or more processor components. In some designs, the functionality of modules 1002-1010 may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 10, as well as other components and functions described herein, may be implemented using any suitable means. Such means also may be implemented, at least in part, using corresponding structure as taught herein. For example, the components described above in conjunction with the "module for" components of FIG. 10 also may correspond to similarly designated "means for" functionality. Thus, in some aspects, one or more of such means may be implemented using one or more of processor components, integrated circuits, or other suitable structure as taught herein.

Further, those of skill in the art will appreciate that the various illustrative logical blocks, modules, circuits, and algorithm steps described in connection with the embodiments disclosed herein may be implemented as electronic hardware or a combination of computer software and electronic hardware. To clearly illustrate this interchangeability of hardware and hardware-software combinations, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a non-transitory computer-readable media embodying a method for the thermal management of a mobile device. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A mobile device, comprising:
an exterior housing configured to provide a backside of the mobile device;
a display coupled to the exterior housing to provide a front side of the mobile device opposite the backside;
a capacitive sensor coupled to exterior housing at the backside of the mobile device wherein the capacitive sensor comprises a metal plate providing a first storage conductor of a capacitor and wherein the capacitive sensor is configured such that a user touching the backside of the mobile device provides a second storage conductor of the capacitor separated from the first storage conductor by at least an insulating material;
a temperature sensor coupled to one or more components of the mobile device;
a controller coupled to the capacitive sensor and to the temperature sensor, wherein the controller is configured to:
detect a presence of a case installed on the exterior housing based on an output of the capacitive sensor;
adjust a temperature threshold of the mobile device in response to detecting the presence of the case installed on the exterior housing; and
adjust one or more operating parameters of the mobile device to control a temperature of the exterior housing to below the temperature threshold based on the output of the capacitive sensor and one or more readings of the temperature sensor.

2. The mobile device of claim 1, further comprising a processor, wherein to adjust the one or more operating parameters of the mobile device the controller is configured to reduce an operating frequency of the processor.

3. The mobile device of claim 1, wherein the controller is further configured to:
determine whether the one or more readings of the temperature sensor indicate that the temperature threshold of the exterior housing has been exceeded; and
adjust the one or more operating parameters of the mobile device to maintain the temperature of the exterior housing to below to the temperature threshold in response to determining that the temperature threshold of the exterior housing has been exceeded.

4. The mobile device of claim 1, wherein the controller is further configured to:
adjust the temperature threshold to a first value in response to detecting the presence of the case installed on the exterior housing; and
adjust the temperature threshold to a second value in response to detecting an absence of the case installed on the exterior housing, wherein the first value is greater than the second value to allow the temperature of the exterior housing to be greater when the case is installed than when the case is not installed on the exterior housing.

5. The mobile device of claim 1, wherein the controller is further configured to:
determine whether a user is touching the backside of the mobile device based the output of the capacitive sensor;

adjust the temperature threshold of the mobile device to a first value in response to both:
the output of the capacitive sensor indicating that the user is touching the backside of the mobile device; and
the output of the capacitive sensor indicating the presence of the case installed on the exterior housing; and
adjust the temperature threshold of the mobile device to a second value in response to both:
the output of the capacitive sensor indicating that the user is touching the backside of the mobile device; and
the output of the capacitive sensor indicating an absence of the case installed on the exterior housing; and
adjust the temperature threshold of the mobile device to a third value in response to the output of the capacitive sensor indicating that the user is not touching the backside of the mobile device.

6. The mobile device of claim 5, wherein the first value is greater than the second value, and wherein the third value is greater than the first value.

7. The mobile device of claim 1, wherein the exterior housing comprises the insulating material providing a dielectric portion of the capacitor, and wherein the capacitive sensor is configured such that the user touching the backside of the mobile device provides the second storage conductor of the capacitor separated from the first storage conductor by at least the insulating material of the exterior housing.

8. The mobile device of claim 1, wherein the exterior housing comprises metal, the insulating material disposed between the metal plate and the exterior housing to provide a dielectric portion of the capacitor, and wherein the capacitive sensor is configured such that the user touching the backside of the mobile device provides the second storage conductor of the capacitor separated from the first storage conductor by at least the insulating material and the exterior housing.

9. The mobile device of claim 1, wherein the capacitive sensor is a first capacitive sensor coupled to the exterior housing at a first region of the backside of the mobile device, the mobile device further comprising a second capacitive sensor coupled to the exterior housing at a second region of the backside of the mobile device, wherein the controller is further configured to:
determine whether a user is touching the backside of the mobile device at the first region of the backside of the mobile device based an output of the first capacitive sensor;
determine whether the user is touching the backside of the mobile device at the second region of the backside of the mobile device based on an output of the second capacitive sensor;
adjust the temperature threshold of the mobile device to a fourth value in response to the output of the first capacitive sensor indicating that the user is touching the backside of the mobile device at the first region; and
adjust the temperature threshold of the mobile device to a fifth value in response to both:
the output of the first capacitive sensor indicating that the user is not touching the backside of the mobile device at the first region; and
the output of the second capacitive sensor indicating that the user is touching the backside of the mobile device at the second region, wherein the fourth value is less than the fifth value to allow the temperature of the exterior housing to be greater at the first region when the user is touching the second region and not the first region.

10. A method, comprising:
receiving one or more temperature readings representative of a temperature of an exterior housing at a backside of a mobile device;
receiving an output of a capacitive sensor coupled to the exterior housing at the backside of the mobile device, wherein the capacitive sensor comprises a metal plate providing a first storage conductor of a capacitor and wherein the capacitive sensor is configured such that a user touching the backside of the mobile device provides a second storage conductor of the capacitor separated from the first storage conductor by at least an insulating material;
detecting a presence of a case installed on the exterior housing based on the output of the capacitive sensor;
adjusting a temperature threshold of the mobile device in response to detecting the presence of the case installed on the exterior housing; and
adjusting one or more operating parameters of the mobile device to control the temperature of the exterior housing to below the temperature threshold based on the output of the capacitive sensor and the one or more temperature readings.

11. The method of claim 10, wherein adjusting the one or more operating parameters of the mobile device comprises reducing an operating frequency of a processor of the mobile device.

12. The method of claim 10, wherein adjusting the one or more operating parameters of the mobile device comprises determining whether the one or more readings of the temperature sensor indicate that the temperature threshold of the exterior housing has been exceeded; and if so, adjusting the one or more operating parameters of the mobile device.

13. The method of claim 10, wherein adjusting the temperature threshold comprises:
adjusting the temperature threshold to a first value in response to detecting the presence of the case installed on the exterior housing; and
adjusting the temperature threshold to a second value in response to detecting an absence of the case installed on the exterior housing, wherein the first value is greater than the second value to allow the temperature of the exterior housing to be greater when the case is installed than when the case is not installed on the exterior housing.

14. The method of claim 10, further comprising:
determining whether the user is touching the backside of the mobile device based the output of the capacitive sensor, wherein adjusting the temperature threshold comprises:
adjusting the temperature threshold of the mobile device to a first value in response to both:
the output of the capacitive sensor indicating that the user is touching the backside of the mobile device; and
the output of the capacitive sensor indicating the presence of the case installed on the exterior housing; and
adjusting the temperature threshold of the mobile device to a second value in response to both:
the output of the capacitive sensor indicating that the user is touching the backside of the mobile device; and the output of the capacitive sensor indicating an absence of the case installed on the exterior housing; and adjusting the temperature threshold of the mobile device to a third value in response to the output of the capacitive sensor indicating that the user is not touching the backside of the mobile device.

15. The method of claim 14, wherein the first value is greater than the second value, and wherein the third value is greater than the first value.

16. The method of claim 10, wherein the capacitive sensor is a first capacitive sensor coupled to the exterior housing at a first region of the backside of the mobile device, the mobile device further comprising a second capacitive sensor coupled to the exterior housing at a second region of the backside of the mobile device, the method further comprising:

determining whether the user is touching the backside of the mobile device at the first region of the backside of the mobile device based an output of the first capacitive sensor;

determining whether the user is touching the backside of the mobile device at the second region of the backside of the mobile device based on an output of the second capacitive sensor;

adjusting the temperature threshold of the mobile device to a fourth value in response to the output of the first capacitive sensor indicating that the user is touching the backside of the mobile device at the first region; and adjusting the temperature threshold of the mobile device to a fifth value in response to both:

the output of the first capacitive sensor indicating that the user is not touching the backside of the mobile device at the first region; and the output of the second capacitive sensor indicating that the user is touching the backside of the mobile device at the second region, wherein the fourth value is less than the fifth value to allow the temperature of the exterior housing to be greater at the first region when the user is touching the second region and not the first region.

17. A mobile device, comprising:

an exterior housing configured to provide a backside of the mobile device;

a display coupled to the exterior housing to provide a front side of the mobile device opposite the backside;

means for sensing a capacitance of the exterior housing at the backside of the mobile device;

means for detecting a temperature of the exterior housing at the backside of the mobile device;

means for detecting a presence of a case installed on the exterior housing based on the capacitance of the exterior housing at the backside of the mobile device;

means for adjusting a temperature threshold of the mobile device in response to detecting the presence of the case installed on the exterior housing, wherein the means for adjusting the temperature threshold comprises:

means for adjusting the temperature threshold to a first value in response to detecting the presence of the case installed on the exterior housing; and means for adjusting the temperature threshold to a second value in response to detecting an absence of the case installed on the exterior housing, wherein the first value is greater than the second value to allow the temperature of the exterior housing to be greater when the case is installed than when the case is not installed on the exterior housing; and means for adjusting one or more operating parameters of the mobile device to control the temperature of the exterior housing to below the temperature threshold based on the capacitance and the temperature of the exterior housing at the backside of the mobile device.

18. The mobile device of claim 17, further comprising a processor, wherein the means for adjusting the one or more operating parameters of the mobile device comprises means for reducing an operating frequency of the processor.

19. The mobile device of claim 17, wherein the means for adjusting the one or more operating parameters of the mobile device comprises means for determining whether the temperature of the exterior housing exceeds the temperature threshold.

20. The mobile device of claim 17, further comprising:

means for determining whether a user is touching the backside of the mobile device based the capacitance of the exterior housing at the backside of the mobile device, wherein the means for adjusting the temperature threshold to the first value comprises means for adjusting the temperature threshold of the mobile device to the first value in response to both:

the capacitance indicating that the user is touching the backside of the mobile device; and the capacitance indicating the presence of the case installed on the exterior housing; and wherein the means for adjusting the temperature threshold to the second value comprises means for adjusting the temperature threshold of the mobile device to the second value in response to both:

the capacitance indicating that the user is touching the backside of the mobile device; and the capacitance indicating an absence of the case installed on the exterior housing; and means for adjusting the temperature threshold of the mobile device to a third value in response to the capacitance indicating that the user is not touching the backside of the mobile device.

21. The mobile device of claim 20, wherein the first value is greater than the second value, and wherein the third value is greater than the first value.

22. The mobile device of claim 17, wherein the means for sensing the capacitance is further configured to sense a first capacitance at a first region of the backside of the mobile device and a second capacitance at a second region of the backside of the mobile device, the mobile device further comprising:

means for determining whether a user is touching the backside of the mobile device at the first region of the backside of the mobile device based the first capacitance;

means for determining whether the user is touching the backside of the mobile device at the second region of the backside of the mobile device based on the second capacitance;

means for adjusting the temperature threshold of the mobile device to a fourth value in response to the first capacitance indicating that the user is touching the backside of the mobile device at the first region; and means for adjusting the temperature threshold of the mobile device to a fifth value in response to both:

the first capacitance indicating that the user is not touching the backside of the mobile device at the first region; and the second capacitance indicating that the user is touching the backside of the mobile device at the second region, wherein the fourth value is less than the fifth value to allow the temperature of the exterior housing to be greater at the first region when the user is touching the second region and not the first region.

23. A non-transitory computer-readable medium including program code stored thereon for use in a mobile device, the program code comprising instructions to direct the mobile device to:
   receive one or more temperature readings representative of a temperature of an exterior housing at a backside of the mobile device;
   receive an output of a capacitive sensor coupled to the exterior housing at the backside of the mobile device, wherein the capacitive sensor comprises a metal plate providing a first storage conductor of a capacitor and wherein the capacitive sensor is configured such that a user touching the backside of the mobile device provides a second storage conductor of the capacitor separated from the first storage conductor by at least an insulating material;
   detect a presence of a case installed on the exterior housing based on the output of the capacitive sensor;
   adjust a temperature threshold of the mobile device in response to detecting the presence of the case installed on the exterior housing; and
   adjust one or more operating parameters of the mobile device to control the temperature of the exterior housing to below the temperature threshold based on the output of the capacitive sensor and one or more temperature readings.

24. The non-transitory computer-readable medium of claim 23, wherein the program code further comprises instructions to direct the mobile device to:
   adjust the temperature threshold to a first value in response to detecting the presence of the case installed on the exterior housing; and
   adjust the temperature threshold to a second value in response to detecting an absence of the case installed on the exterior housing, wherein the first value is greater than the second value to allow the temperature of the exterior housing to be greater when the case is installed than when the case is not installed on the exterior housing.

25. The non-transitory computer-readable medium of claim 23, wherein the program code further comprises instructions to direct the mobile device to:
   determine whether the user is touching the backside of the mobile device based the output of the capacitive sensor, wherein the instructions to adjust the temperature threshold comprises instructions to:
      adjust the temperature threshold of the mobile device to a first value in response to both:
         the output of the capacitive sensor indicating that the user is touching the backside of the mobile device; and
         the output of the capacitive sensor indicating the presence of the case installed on the exterior housing; and
      adjust the temperature threshold of the mobile device to a second value in response to both:
         the output of the capacitive sensor indicating that the user is touching the backside of the mobile device; and
         the output of the capacitive sensor indicating an absence of the case installed on the exterior housing; and
      adjust the temperature threshold of the mobile device to a third value in response to the output of the capacitive sensor indicating that the user is not touching the backside of the mobile device.

26. The non-transitory computer-readable medium of claim 25, wherein the first value is greater than the second value, and wherein the third value is greater than the first value.

* * * * *